June 29, 1965 R. F. COBAUGH 3,191,281
APPARATUS FOR MAKING ELECTRICAL CONNECTIONS
Filed June 4, 1964 15 Sheets-Sheet 1
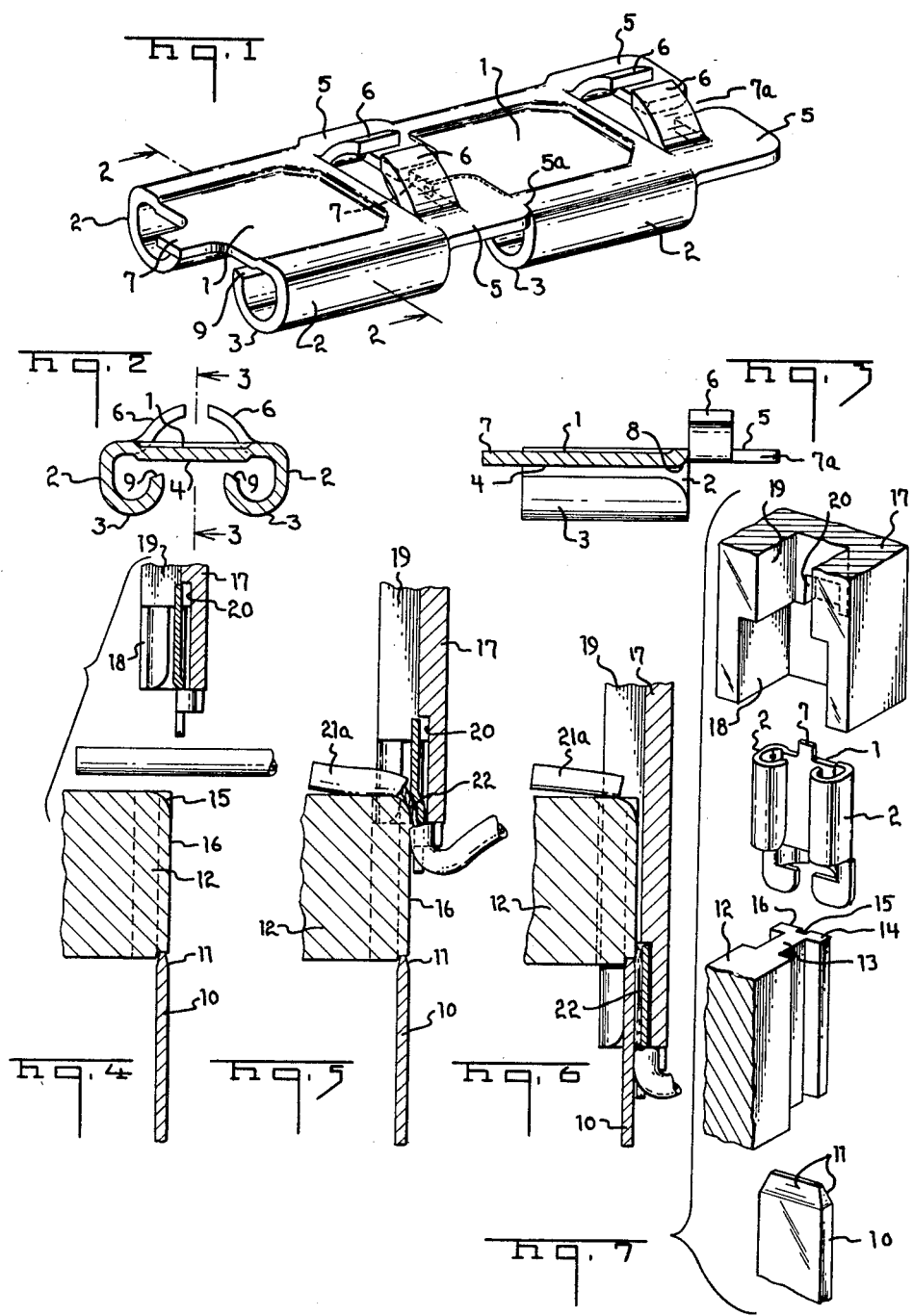

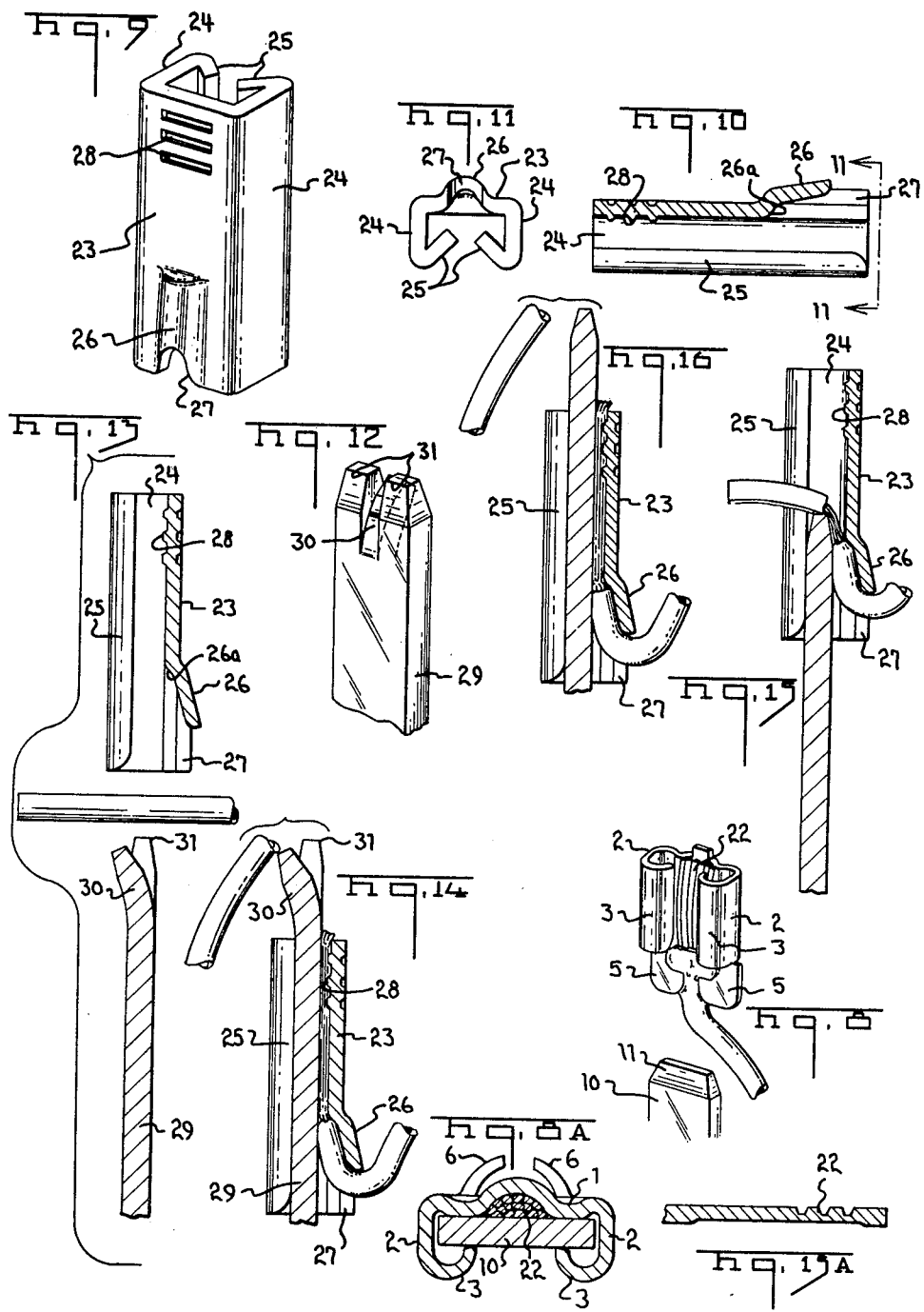

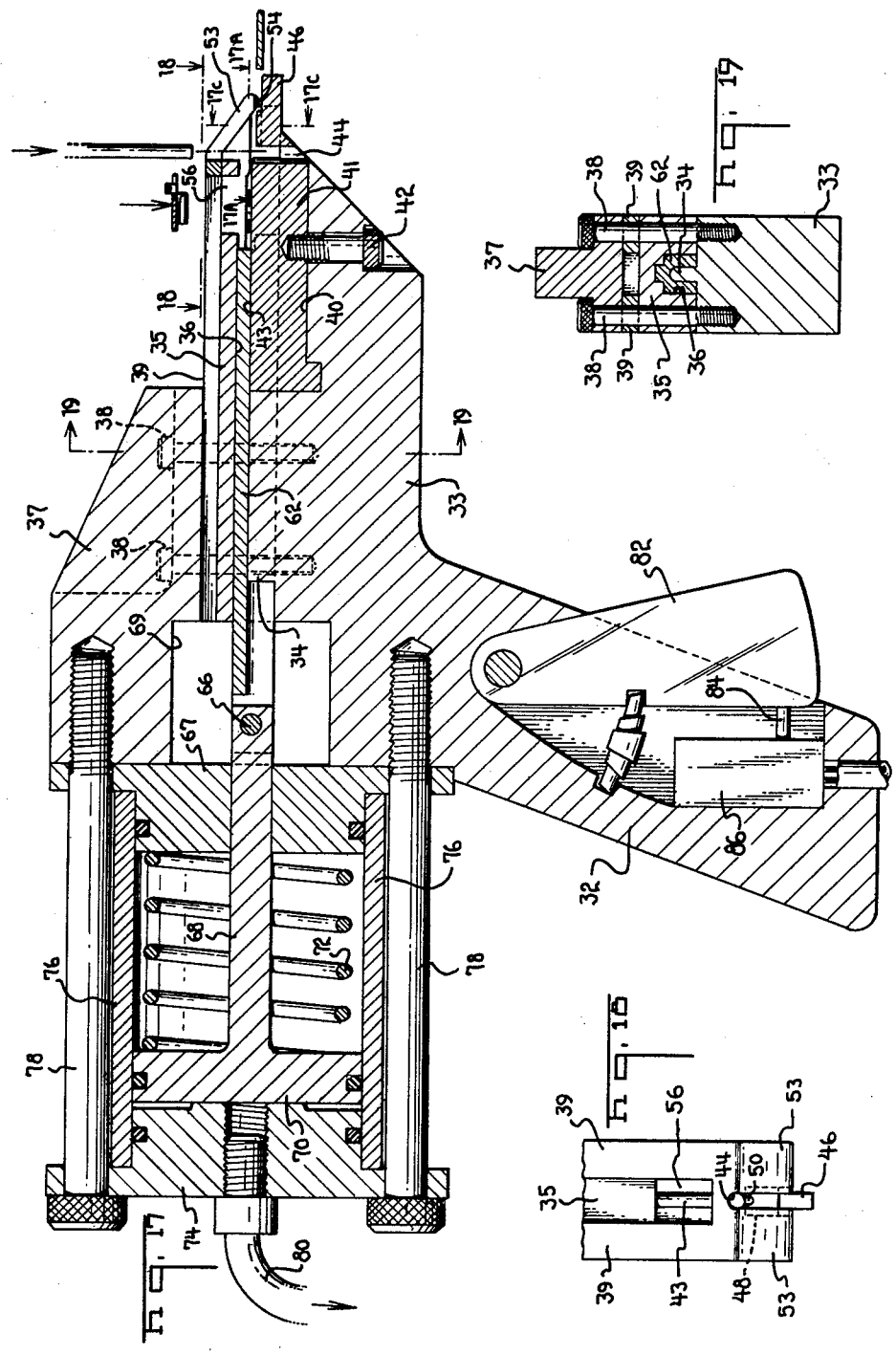

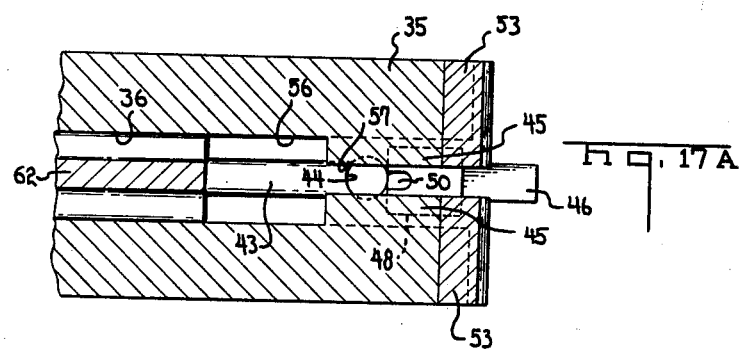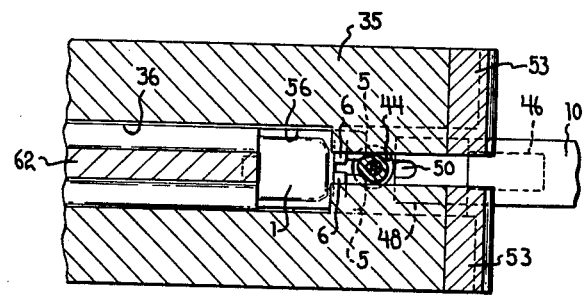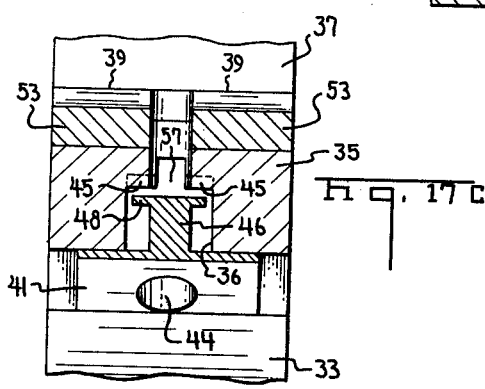

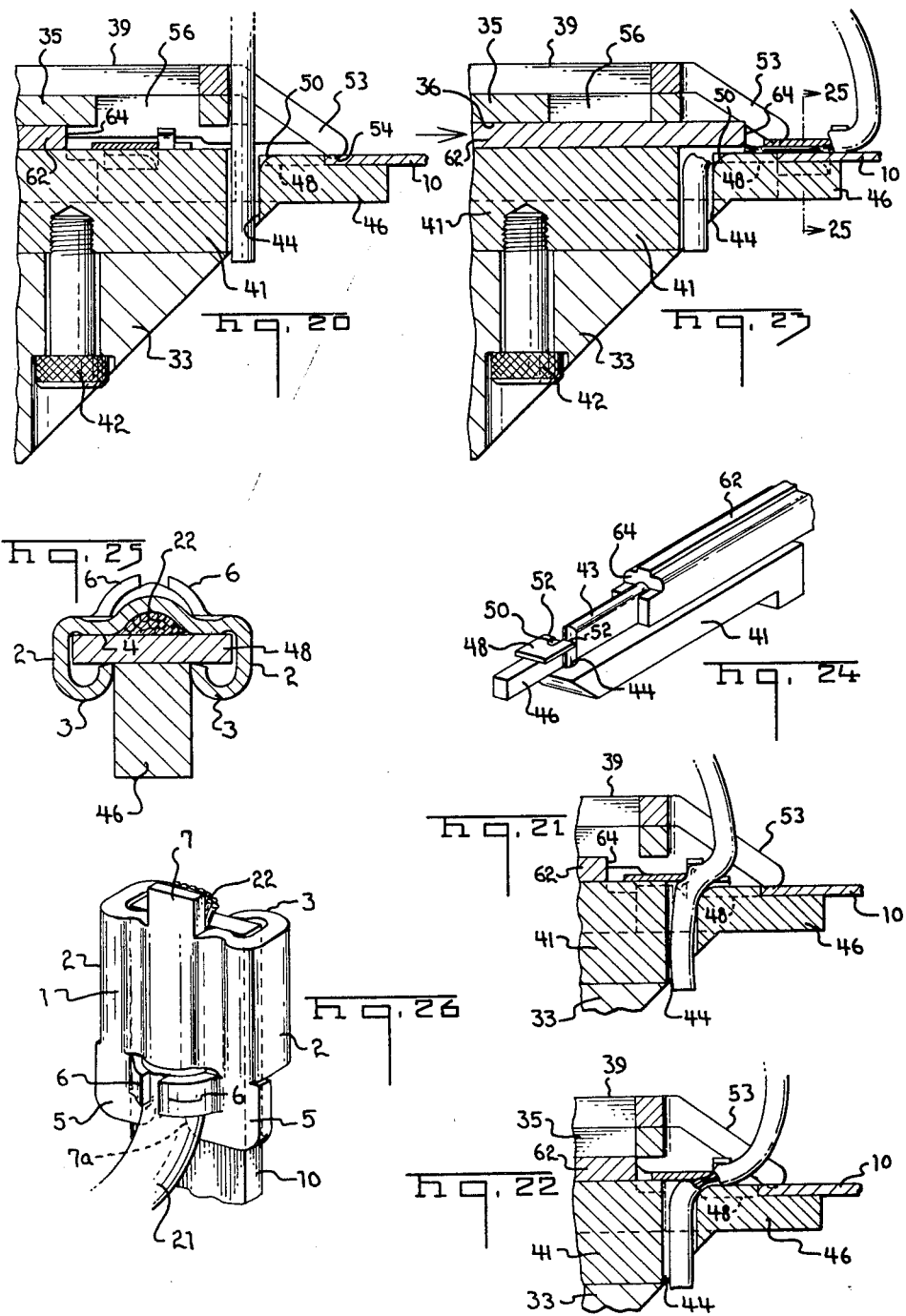

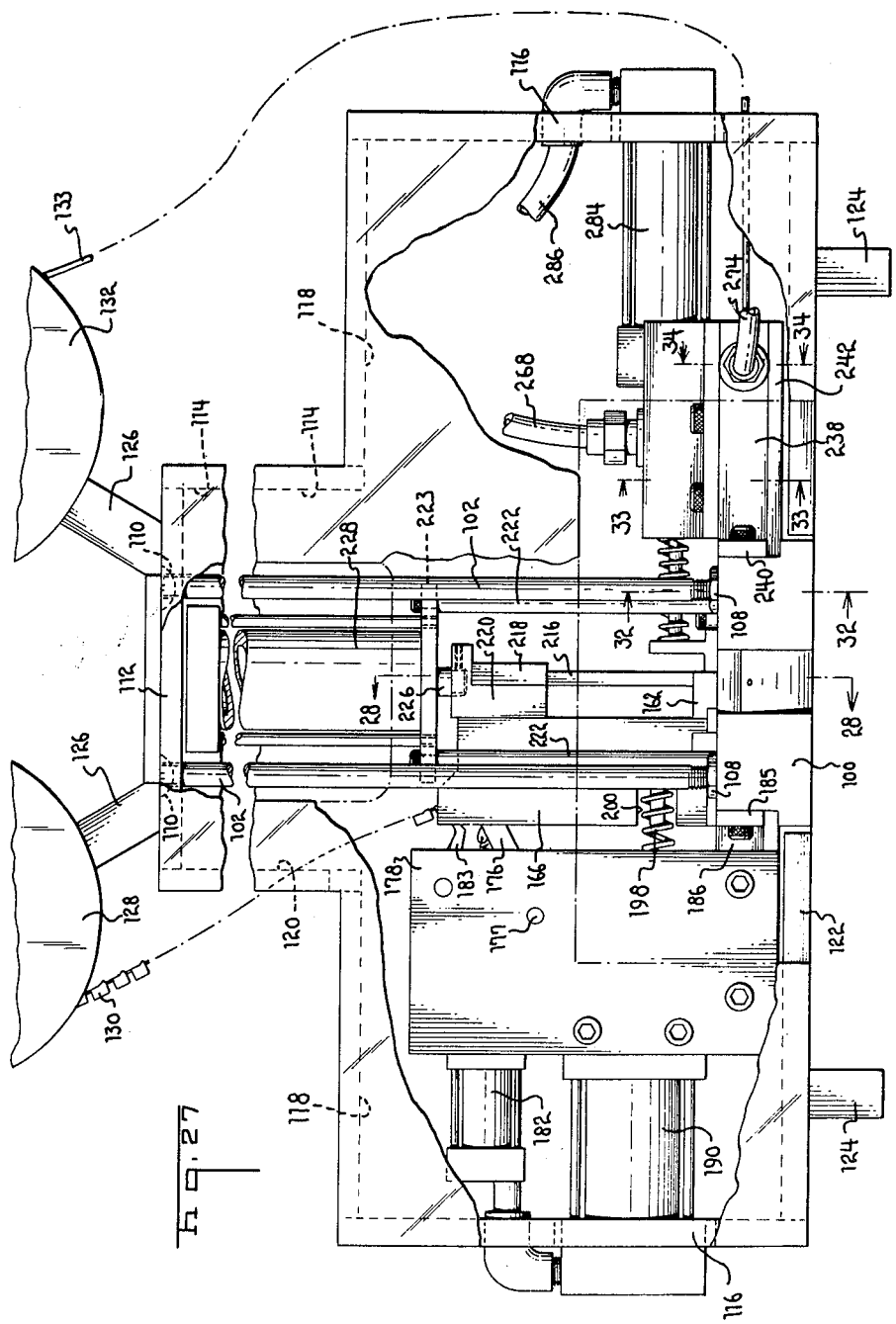

June 29, 1965    R. F. COBAUGH    3,191,281
APPARATUS FOR MAKING ELECTRICAL CONNECTIONS
Filed June 4, 1964    15 Sheets-Sheet 7
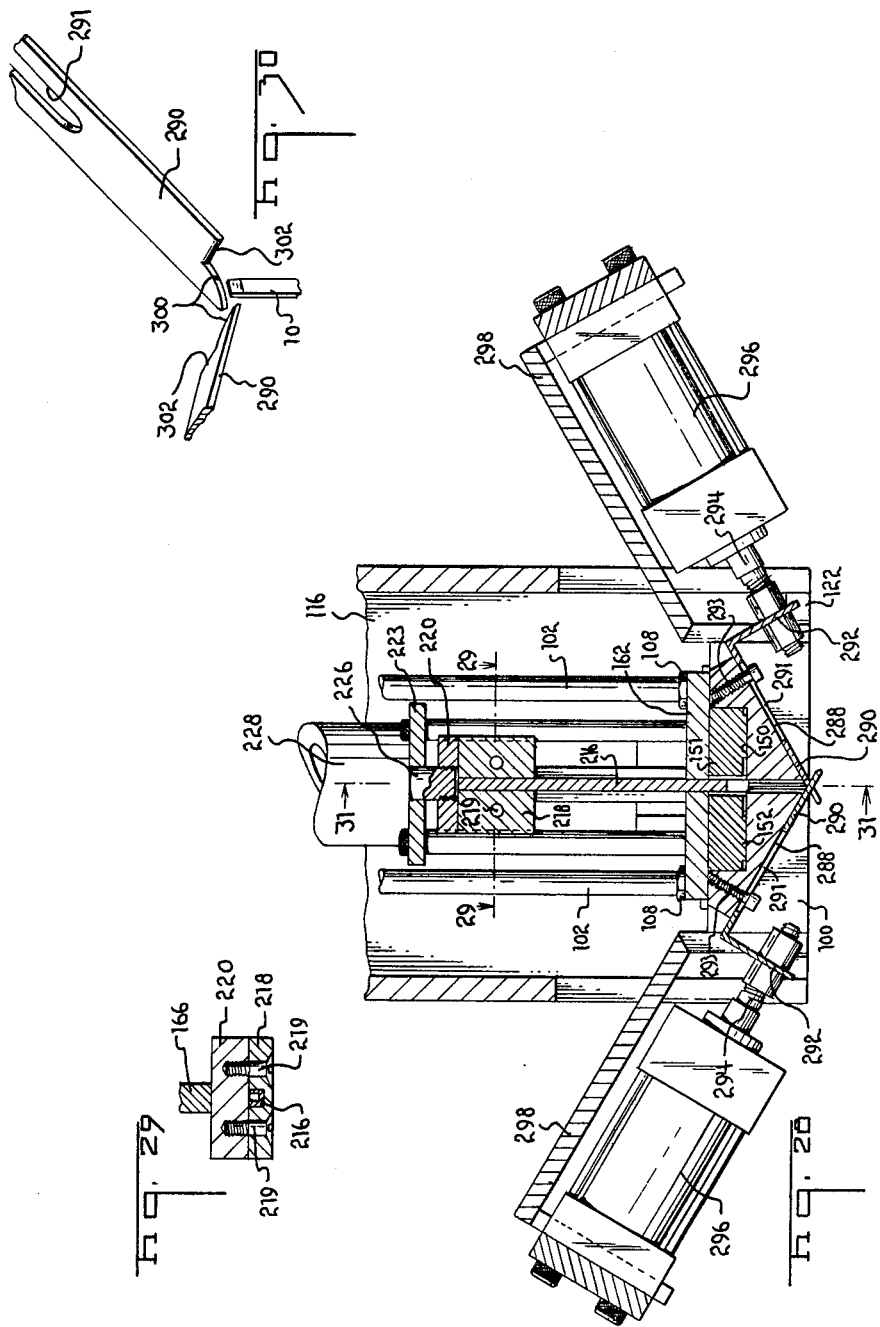

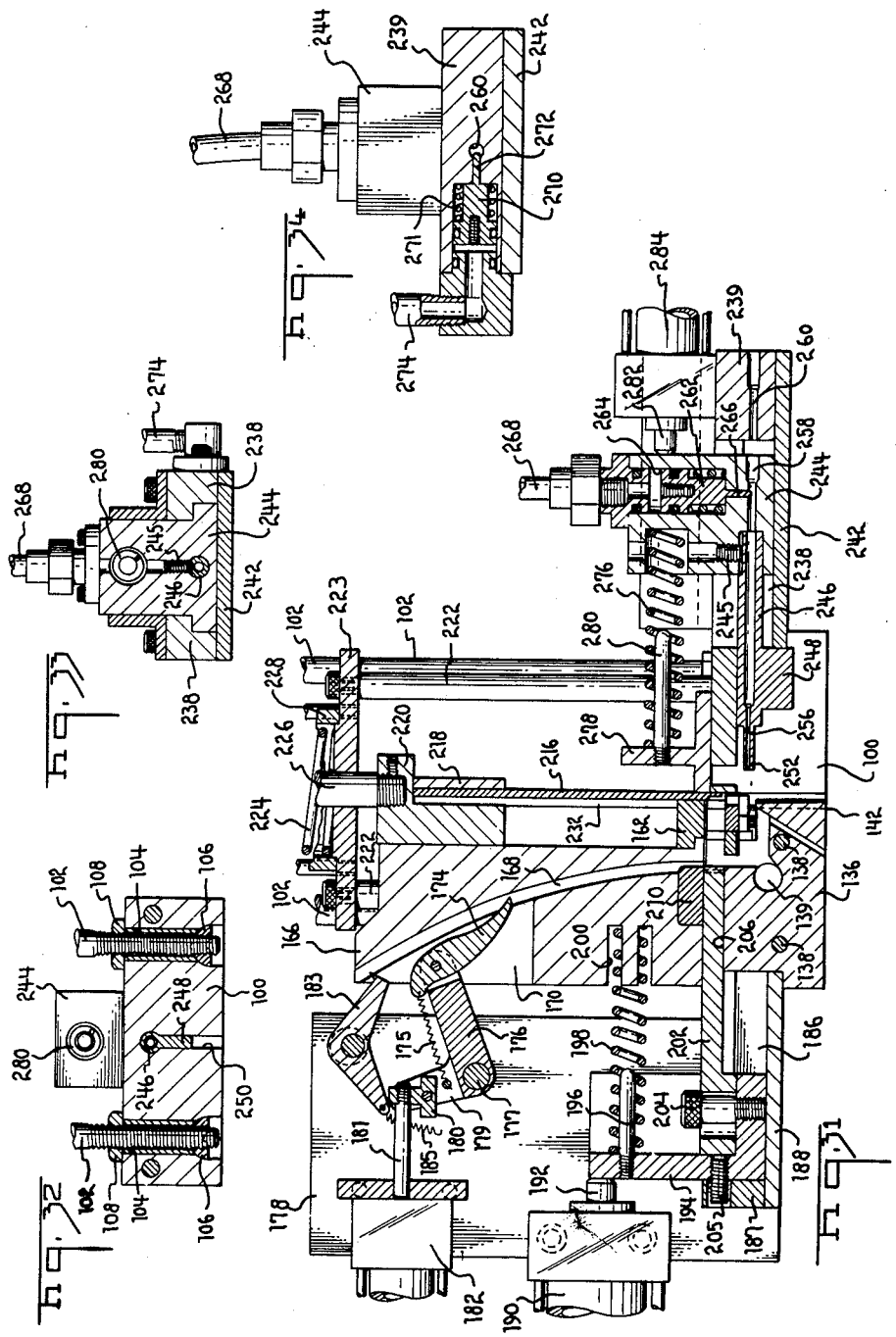

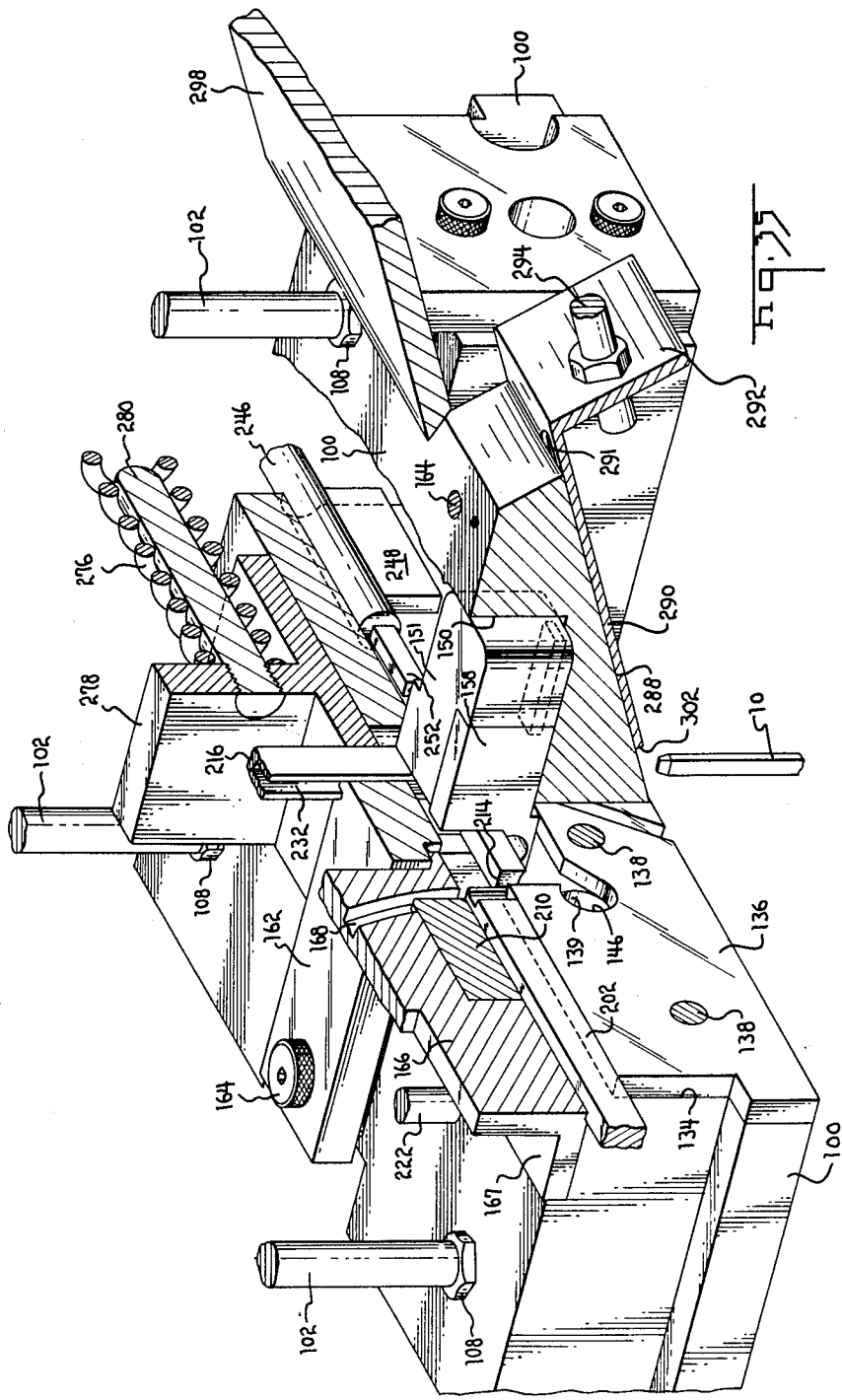

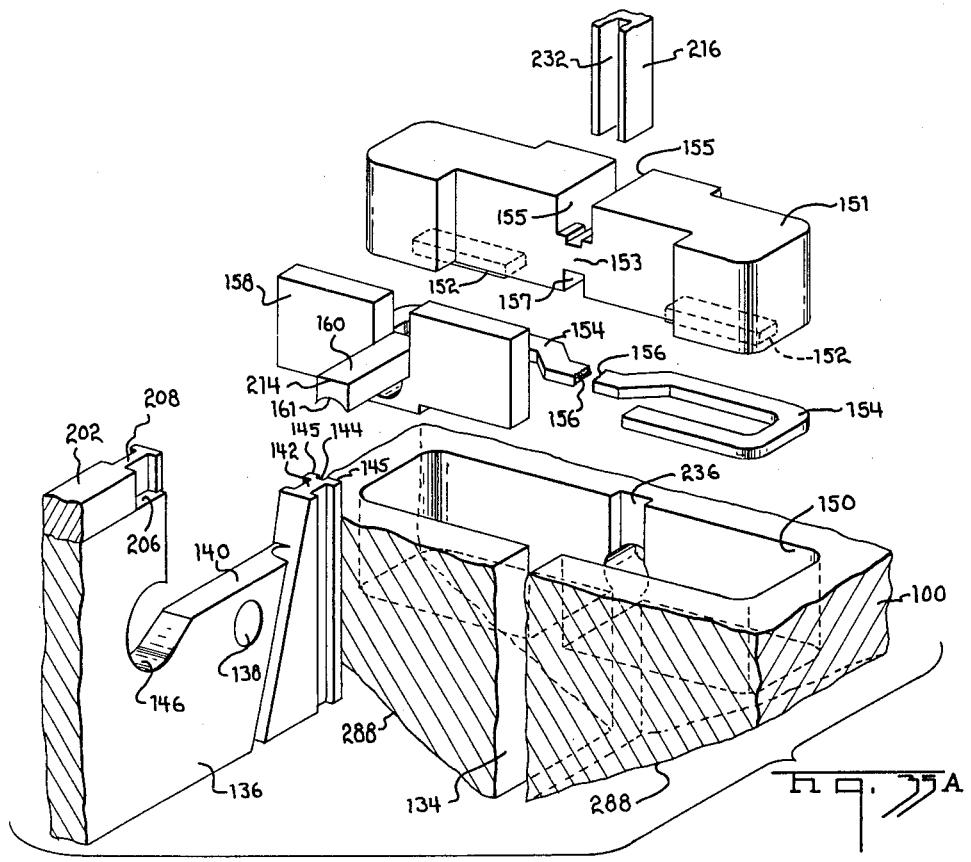

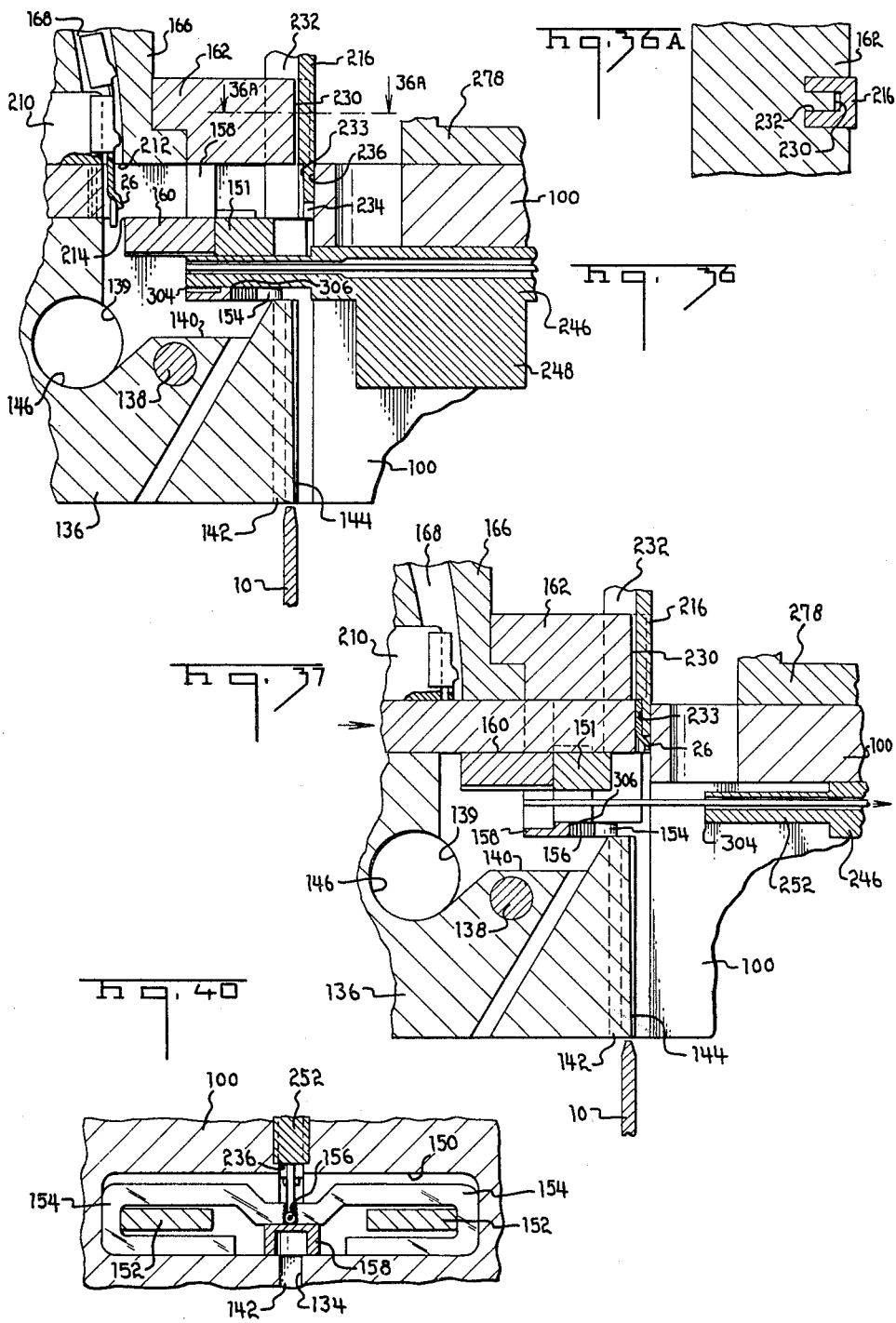

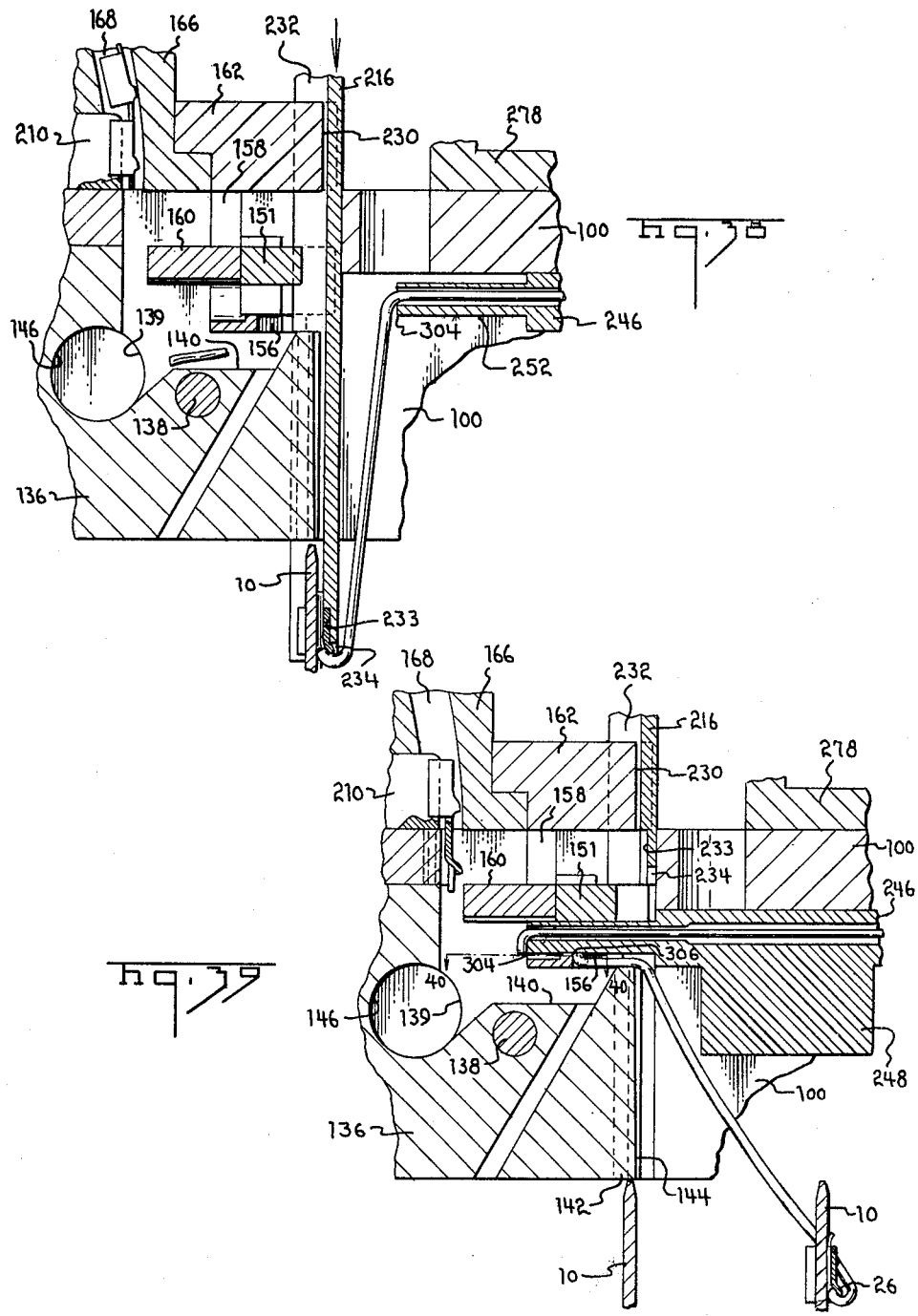

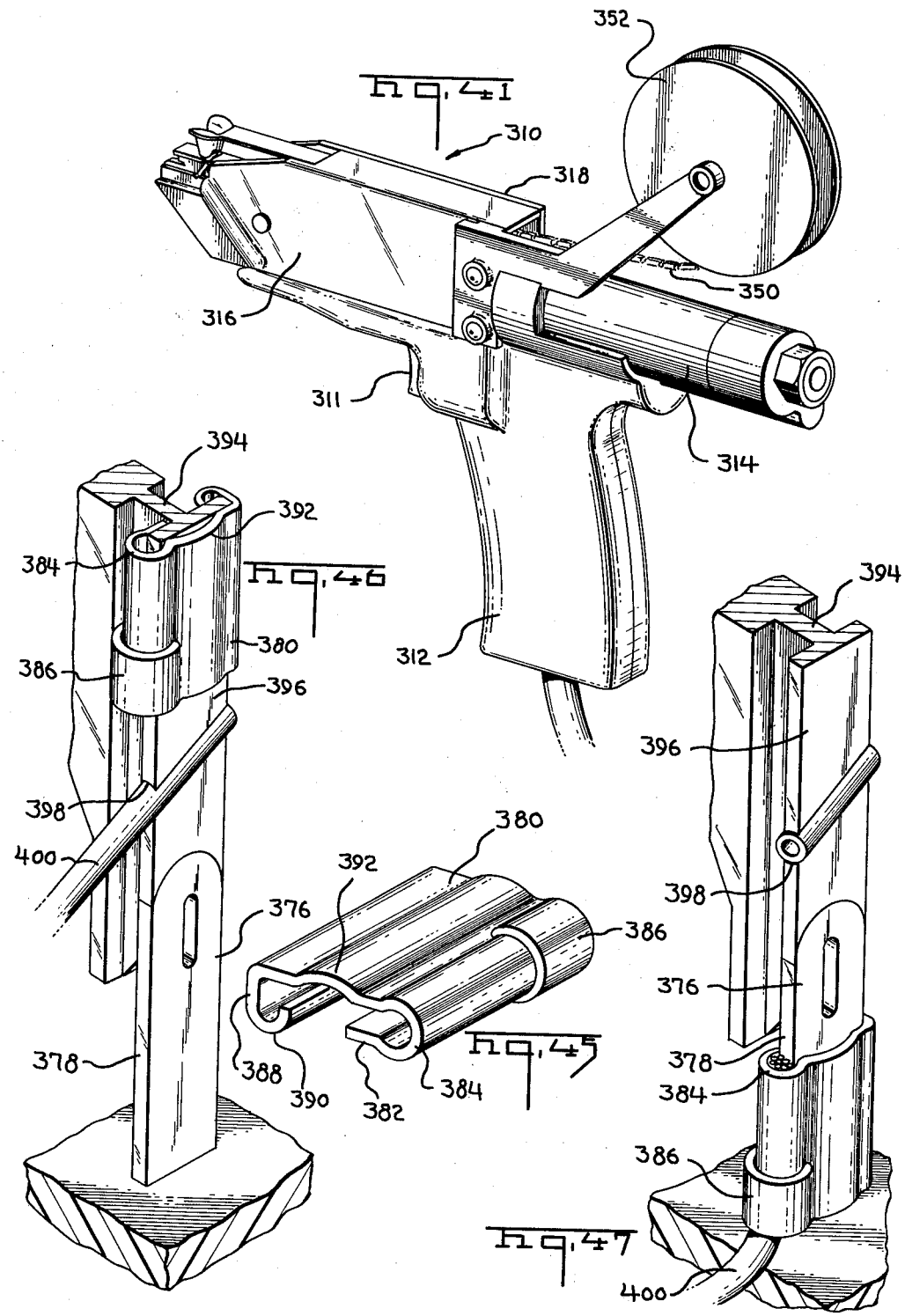

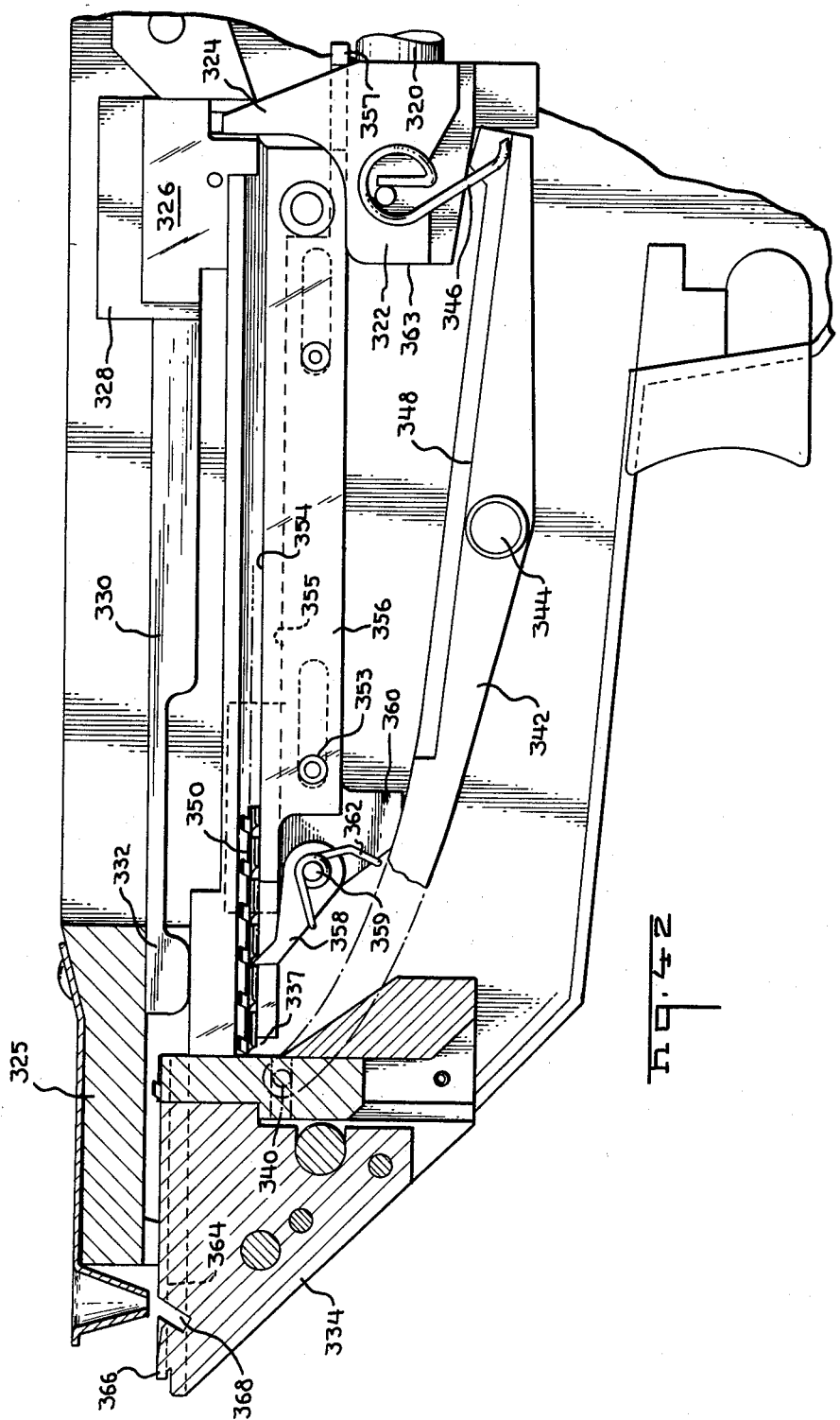

June 29, 1965  R. F. COBAUGH  3,191,281
APPARATUS FOR MAKING ELECTRICAL CONNECTIONS
Filed June 4, 1964  15 Sheets-Sheet 15

United States Patent Office

3,191,281
Patented June 29, 1965

3,191,281
APPARATUS FOR MAKING ELECTRICAL
CONNECTIONS
Robert Franklin Cobaugh, Hershey, Pa., assignor to
AMP Incorporated, Harrisburg, Pa.
Filed June 4, 1964, Ser. No. 372,651
4 Claims. (Cl. 29—203)

This invention relates to apparatus for making electrical connections between terminal posts or tabs and electrical conductors. This application is a continuation-in-part of my copending application, Serial No. 171,074, filed February 5, 1962, for Electrical Connections.

An object of the invention is to provide an improved apparatus for making electrical connections between terminal posts, or the like, and conductors by means of terminal clips which are axially movable onto the posts and which have an open seam extending axially along one side thereof. A further object is to provide an apparatus for making electrical connections between conductors and terminal posts which does not require preparation, such as insulation stripping, of the conductor which is to be connected to the post. A still further object is to provide an apparatus in the form of a relatively simple hand tool for electrically connecting a conductor to a terminal post by means of a terminal clip. A further object is to provide an automatic wiring machine type apparatus for making electrical connections between terminal posts and conductors.

An electrical connection, in accordance with the principles described in my above-identified copending application, Serial No. 171,074, and in my copending application, Serial No. 338,663, filed January 20, 1964, comprises a terminal post and a terminal clip, the clip having an open seam extending axially along one side thereof and being in embracing relationship to the post. The electrical conductor is held against, and in electrical and mechanical contact with, the post by the clip and is clamped between the side of the post and the internal surface of the clip which is opposite to the open seam.

A preferred embodiment of the present invention comprises a mandrel conforming to the internal cross-section of the terminal clip and means for pushing the clip over, and beyond, the end of the mandrel. In accordance with one embodiment, the mandrel is of generally T-shaped cross-section so that the terminal clip can be pushed across the mandrel with the sides of the open seam against the rib portion of the mandrel and with the head portion of the mandrel disposed between the sidewalls of the clip. Means are provided for positioning the wire with its axis extending transversely of the path of movement of the clip so that as the clip is pushed against the wire, over the surface of the mandrel, and onto the post, the clip engages the wire and drags it over the surface of the mandrel and onto the post to produce a finished electrical connection as described in my copending application, Serial No. 338,-633. This wire positioning means may take the form of an opening extending into the head of the mandrel so that the end of the wire can be positioned in the opening and will lie with its axis extending transversely of the path of movement of the clip. In accordance with other embodiments of my invention, the wire may be disposed transversely of the mandrel and adjacent to the one end which is disposed upstream (relative to the direction of movement of the clip) from the end of the mandrel which is normally positioned against the terminal post. As will be apparent from the description presented below, this mandrel and clip pusher combination can be utilized in a relatively simple manually actuated hand tool, in a power actuated hand tool, and in an automatic wiring machine. The general principles of the invention, as described herein, are applicable to the making of electrical connections with bare wires, with wires having a relatively thick insulating sheath of vinyl or the like thereon, with wires having a thin film of insulating material thereon such as Formvar (polyvinyl formal resin), with the so-called tinsel wires which comprise a plurality of generally helical strands which are internally supported by fibers and which are normally insulated with a conventional insulating sheath, and with flat conductor cable. If insulated wire is being used, the mandrel is advantageously provided with a suitable means for removing the insulation from the wire or in some way slitting or cutting into the insulation in a manner such that the metallic core of the wire is exposed.

In the drawing:
FIGURE 1 is a perspective view showing two terminal clips in accordance with the invention in end-to-end strip form;
FIGURE 2 is a sectional view taken along the lines 2—2 of FIGURE 1;
FIGURE 3 is a side view of the clip of FIGURE 1 taken along the lines 3—3 of FIGURE 2;
FIGURES 4, 5 and 6 are fragmentary views illustrating the progressive steps in the application of the type of clip shown in FIGURE 1 to a terminal post or tab and illustrating the stripping of the conductor during such application;
FIGURE 7 is an exploded fragmentary view showing a terminal post, a mandrel in accordance with the invention, a terminal clip, and the end portion of a tool for applying the clip to a post;
FIGURE 8 is a view showing a clip of the type shown in FIGURE 1 on the end of a conductor after it has been removed from a terminal post;
FIGURE 8A is a cross-sectional view showing the clip of FIGURE 1 on a post;
FIGURE 9 is a perspective view of an alternative form of terminal clip;
FIGURE 10 is a sectional side view of the clip of FIGURE 9;
FIGURE 11 is an end view taken along the lines 11—11 of FIGURE 10;
FIGURE 12 is a perspective of a terminal post having a wire stripping means on its end;
FIGURES 13 and 14 are side views illustrating the method of the invention as practiced with the terminal clip of FIGURE 9 and the terminal post of FIGURE 12;
FIGURES 15 and 16 are sectional side views showing the method of the invention as practiced with a conventional terminal post and the clip of FIGURE 9;
FIGURE 15A is a profile view of a wire which has been connected to a post with a clip of the type shown in FIGURE 9;
FIGURE 17 is a sectional side view showing a hand tool for applying clips of the type shown in FIGURE 1 to terminal posts in accordance with the invention;
FIGURE 17A is a view taken along the lines 17A—17A of FIGURE 17;
FIGURE 17B is a view similar to FIGURE 17A but showing the nose of the tool positioned against a terminal post and illustrating the manner in which the clip engages the wire;
FIGURE 17C is a view taken along the lines 17C—17C of FIGURE 17;
FIGURES 18 and 19 are views taken along the lines 18—18 and 19—19 of FIGURE 17;
FIGURES 20, 21, 22 and 23 are fragmentary sectional views showing the nose portion of the tool of FIGURE 17 and illustrating its operation;
FIGURE 24 is a perspective fragmentary view showing the plunger and anvil of the tool of FIGURE 17;

FIGURE 25 is a view taken along the lines 25—25 of FIGURE 23;

FIGURE 26 is a perspective view showing a terminal clip of the type shown in FIGURE 1 on the end of a terminal post;

FIGURE 27 is a frontal view with parts broken away of an alternative apparatus for applying terminal clips to terminal posts in accordance with the invention, this apparatus being adapted to apply clips of the type shown in FIGURE 9;

FIGURE 28 is a sectional view taken along the lines 28—28 of FIGURE 27;

FIGURE 29 is a view taken along the lines 29—29 of FIGURE 28;

FIGURE 30 is a fragmentary perspective view showing the post stabilizing means provided on the embodiment of FIGURE 27;

FIGURE 31 is a sectional view taken along the lines 31—31 of FIGURE 28 showing the details of the wire feed mechanism, the clip feed mechanism, and the clip pusher of the embodiment of FIGURE 27;

Figure 43:
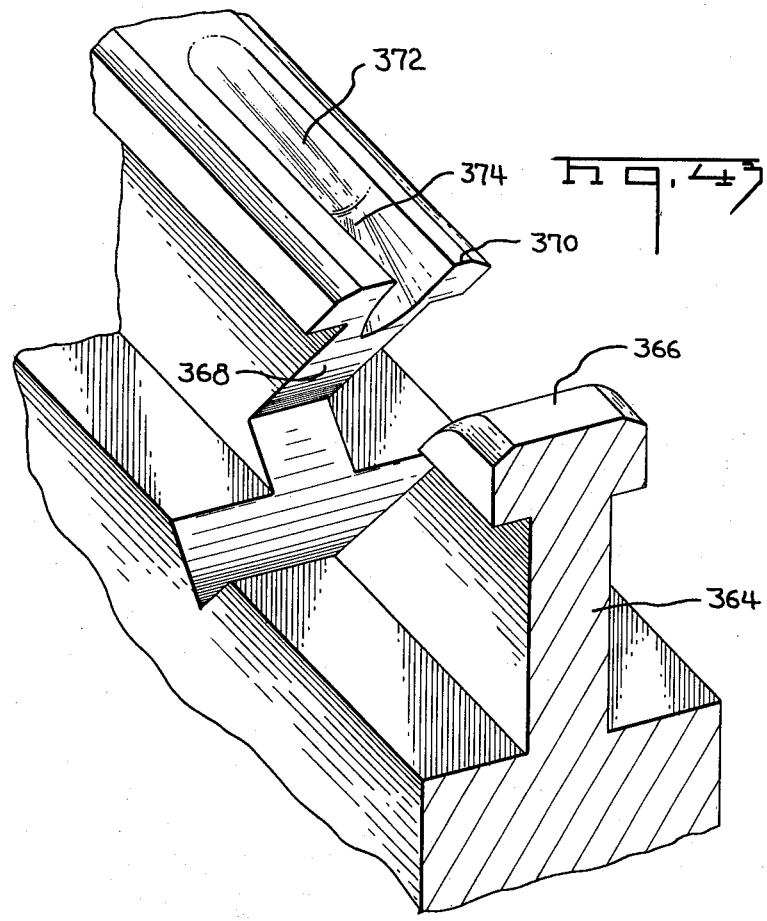
Figure 44:
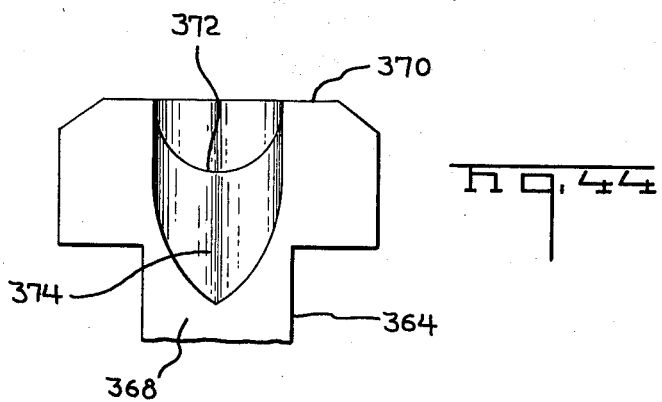

FIGURES 32, 33 and 34 are views taken along the lines 32—32, 33—33 and 34—34 of FIGURE 27;

FIGURE 35 is a fragmentary perspective view with parts broken away showing some details of the clip feed and transfer mechanism, the wire feed mechanism, and the clip pusher of the embodiment of FIGURE 27;

FIGURE 35A is an exploded perspective view showing some features of the mandrel, the clip transfer mechanism, and some associated structure;

FIGURES 36, 37, 38 and 39 are fragmentary sectional views illustrating the application of terminal clips to posts by the embodiment of FIGURE 27 and particularly illustrating the manner in which different posts are electrically connected and the lead wires connecting the posts are simultaneously formed;

FIGURE 36A is a view taken along the lines 36A—36A of FIGURE 36;

FIGURE 40 is a view taken along the lines 40—40 of FIGURE 39;

FIGURE 41 is a perspective view of a pneumatically actuated hand tool in accordance with the invention having means for feeding terminal clips in strip form;

FIGURE 42 is a sectional side view of the frontal portion of the tool of FIGURE 41;

FIGURE 43 is a fragmentary perspective view showing the frontal portion of the mandrel of the tool of FIGURE 42;

FIGURE 44 is a view taken along the lines 44—44 of FIGURE 43;

FIGURE 45 is a perspective view of an alternative form of terminal clip which is adapted to hold a conductor against the side of an extremely thin terminal post;

FIGURE 46 is a perspective view showing an alternative form of mandrel for applying clips of the type shown in FIGURE 45 to a thin terminal post, this view showing the relative positions of the mandrel and clip at the beginning of the operating cycle and before the clip has been applied to the post; and FIGURE 47 is a view similar to FIGURE 46 but showing the positions of the parts after the clip has been applied to the post.

FIGURES 1-7 show one form of terminal clip, in accordance with the invention, and illustrate the method of forming a connection between a wire and a terminal tab or post 10. Terminal posts of this type are commonly used on many types of electrical devices such as electrical appliances, communications equipment, switches, etc.

This embodiment of the terminal clip comprises a substantially flat web 1 having sidewalls 2 extending along the longitudinal edges thereof, these sidewalls being inwardly curved as at 3 towards each other and towards the web. A central portion of the web is inwardly displaced towards the edges of the sidewalls to provide a substantially flat surface 4 which is opposed to the faces or edges 9 of the sidewalls. The web extends beyond the ends of the sidewalls 2 and a pair of tabs 6 are struck up on the opposite side of the web from the sidewalls from this end portion of the web, these tabs forming an insulation support for a wire as is described below. The underside portion 8 of the web which is adjacent to the tabs 6 is rounded (i.e., provided with a radius) as shown in FIGURE 3 to avoid damage to the wire when an electrical connection is made. Advantageously, the clip of FIGURE 1 is manufactured in end-to-end strip form with the rearward end of each clip integral with the forward end of the next adjacent clip as indicated at 5a. When one clip is separated from a strip, it is sheared in a manner which leaves a forwardly extending tab 7 on the web and a complementary recess 7a on the rearward portion 5 of the web, this recess being located centrally of the web in alignment with the struck-up tabs 6.

The clip of FIGURE 1 is applied to a terminal post 10 by means of a mandrel and clip pusher illustrated in FIGURES 4-7. Ordinarily this mandrel and clip pusher, or their functional equivalents, will be integrated in a hand tool or a machine as disclosed below. The fragmentary views of the applicator tooling are shown in FIGURES 4-7 for the purpose of presenting a simplified and brief description of the method of the invention.

The mandrel comprises a T-shaped extension on a mandrel block 12 and has a rib portion 13 and a head portion 14. The width of the head portion 14 is slightly less than the inside width (the distance between the sidewalls) of the clip while the thickness of the head may be substantially equal to or slightly less than the post thickness. A groove 15 is provided in the head portion of the mandrel and extends downwardly as viewed in the drawing from the upper end of the mandrel. This groove slopes towards the surface of the mandrel and functions as a guide for the wire during use of the tool as described below. The edges 16 on each side of the groove 15 are preferably somewhat sharp since these edges cut into the insulation of the wire. On its lower end, the head 14 is cut-away to form a shoulder against which the end 11 of the post 10 is positioned in order to permit the parts to be held in alignment with each other. A clip pusher 17 for pushing the clip onto the post is of channel-shaped cross-section and has an enlarged recess 18 at its lower end which is adapted to receive the clip as shown in FIGURE 7. The opposed sidewalls of this recess 18 are preferably spaced apart by a distance substantially equal to the spacing between the external surfaces of the sidewalls 2 of the clip. The groove 19 of the clip pusher 17 is of a width such as to permit it to receive and pass over the mandrel and a recess 20 is provided at the lower end of this groove to receive the tab 7 of the clip.

In use, the insulated wire is positioned with its axis extending across the upper surface of the mandrel block 12 and with the conducting core thereof in alignment with the notch 15. A clip is placed in the recess 18 of clip pusher 17 and the mandrel is located against the end of the post 10 as shown in FIGURE 5. The clip is then pushed downwardly by means of the clip pusher (FIGURES 4, 5 and 6) across the mandrel and onto the post. As the clip moves downwardly from its initial position, the insulation of the wire is first pinched between the sides of the recess 7a of the clip so that relative movement of the clip with respect to the wire is prevented or at least severely restricted. Upon further downward movement of the clip, the insulation on the wire at a point slightly above the recess 7a is pressed against the edges 16 of the mandrel so that it is cut or punctured. The insulation is then circumferentially torn, as the clip continues its downward movement, by virtue of the fact that it is gripped in the recess 7a and in the recess formed by the struck-up tabs 6 pulled downwardly from the zone of puncture. The severed tubular section of insulation 21a remains at the upper end of the mandrel and the core 22 is pulled downwardly into the notch 15 and withdrawn from the severed section. The curved surface 8 on web 4 adjacent to the tabs 6 and the notch 15 permit the wire core 22 to be withdrawn from the insulation and compressed between the web and the mandrel without damage. In other words, the conducting core is drawn between smooth curved surfaces and is not compressed between sharp edges.

A salient feature of the invention as described thus far is that the manufacturing step of stripping the wire and placing a terminal on its end is combined with the assembling step of placing the electrical connector on the terminal post. Moreover, the actual manipulative step involved is merely one of essentially sliding the clip onto the post. The wire is secured to the clip while the clip is being applied to the post by virtue of the gripping effect of the L-shaped extensions 5 of the web and the insulation support tabs 6 struck therefrom. The end portion of the insulation becomes wedged between these extensions and within the recess formed by the tabs 6 so that if the clip is removed from the post 10 at a later time for service or repair (FIGURE 8), the elongated and drawn out wire strands 22 remain adjacent to the web and the connector itself remains secured to the end of the wire. In effect then, if an electrical connection is made between two posts by means of clips in accordance with the invention, a lead for connecting these two posts is manufactured at the time the connections are made and this lead can later be removed intact with its connectors on its ends.

The quality of the electrical connections formed has been found to be very good. It will be apparent that the metallic core of the wire is firmly held directly against the post and that the clip itself does not need to perform a current carrying function. Furthermore, the direct association of the wire core with the post avoids the need for a separate crimped or soldered connection as with many disengageable connectors of the prior art. It should be added that since the core is pressed against the mandrel surface and later against the post during application, the surface of the conducting core is vigorously abraded and cleaned, a factor which further contributes to the achievement of good electrical conducting properties.

FIGURE 9 shows an alternative embodiment of a clip in accordance with the invention particularly adapted for relatively small wires, e.g. AWG 14 and smaller. This connector has a substantially flat web 23 and sidewalls extending the full length thereof. These sidewalls are inwardly turned as shown at 25 towards the web. The web is notched as shown at 27 at one end and has a cupped or drawn up insulation support 26, the inside surface of which tapers toward the plane of the web as shown at 26a in FIGURE 10. A plurality of inwardly displaced sections 28 are provided in the web to form corrugations which enhance the effect of the contact pressure applied to the wire by the clip.

Clips of the general type shown in FIGURE 9 are applied to terminal posts in substantially the same manner as the clip of FIGURE 1. My copending application, Serial No. 338,663, discloses and claims several alternative embodiments of terminal clips and it will be understood that the clips disclosed in this copending application are all usable with apparatus in accordance with the present invention to form electrical connections.

As an alternative to the use of a separate mandrel, the post itself may be formed in a manner such as to provide a mandrel on its end as shown in FIGURE 12. Thus, the post 29 has a tongue 30 struck from its end portion and bent out of the plane of the post so that cutting edges 31 are provided on each side of the notch formed by the tongue. In accordance with this embodiment the insulated wire is merely positioned with its axis extending across the top of the post and with its insulating core in alignment with the tongue 30. The clip is then pushed downwardly onto the post, FIGURES 13 and 14, so that the edges 31 bite into the insulation and the wire core is dragged down over the surface of the tongue and compressed between the web 23 of the connector and the surface of the post.

Under some circumstances it is feasible to perform the insulation cutting on the end of a conventional terminal post as is shown in FIGURES 15 and 16. The post in these figures has a swaged and slightly tapered end. The wire is positioned with its axis extending across the top of the post and transversely of the plane thereof and the clip is moved relatively downwardly onto the post. In accordance with this embodiment, the constricted end portion of the insulation support surface adjacent to the inside surface of the web 23 presses the insulation against the tapered and swaged end of the post so that the edge of the post penetrates the insulation. Upon further downward movement of the clip, the insulation is circumferentially torn and the core of the wire is pulled downwardly and pressed against the post by the clip as previously described. In this, as in other embodiments, the severed section of insulation is left at the top of the post or at the top of the anvil in the previous embodiment, by virtue of the fact that the clip is of substantially channel-shaped cross-section so that a gap remains on the one side which permits movement of the clip past the severed section of insulation.

FIGURES 17-26 show a form of hand tool for making electrical connections in accordance with the invention using the connector of FIGURE 1. This embodiment comprises a tool body formed in three sections, 33, 35 and 37, the section 33 having a laterally extending handle 32. The intermediate section 35 has a longitudinally extending channel 36 therein and the lower section 33 has an upstanding guide rib 34 which extends centrally along this channel. The three sections of the body are held together by means of screws 38 which extend through the top section, through the arms 39 of a spring member described below and through the intermediate section 35 and into the base section 33. The nose portion of section 33 has a recess 40 in which there is mounted a block 41 (FIGURE 24) held in place by means of a fastener 42. This block has a centrally located guide rib 43 on its upper surface which is in alignment with the previously described rib 34 of the lower body section. A cylindrical opening 44 extends through the block 41 and transversely of the tool axis at the end of the rib 43 and the extreme end of the block has a support member 46 integral therewith and extending from the opposite side of the opening 44 from the rib 43.

The mandrel head comprises a plate 48 mounted on the upper surface of a rib 46, the plate 48 having a recess or notch 50 on its side which is adjacent to the opening 44. Mandrel head 48 should have a width which is substantially equal to the inside width of the clip and a thickness which is slightly less than the thickness of the terminal post or tab. The notch 50 tapers towards the opening 44 and is of a width which is slightly greater than the diameter of the conducting core 22 of the wire and less than the diameter of the wire insulation. The edges 52 of the mandrel on each side of the notch 50 are preferably relatively sharp so that these edges can fuction to cut into the insutation of the wire in a manner described above.

The spring 39 which is interposed between the body section 37 and the body section 35 of the tool has a pair of arms 39 (FIGURE 18) which extend along the upper surface of the section 35 and has a downwardly directed U-shaped end section 53 which extends over mandrel head 48. A guide notch 54 (FIGURE 17) which is of a width substantially equal to the width of the terminal post 10 is provided on the underside of this end 53 of the spring to center the end of the post with respect to guide block 46 and mandrel 46, 48 during use.

The upper surface of intermediate body section 35 has an opening 56 adjacent to the end of the rib 43 and the laterally extending opening 44 in block 41. Opening 56 is of a length sufficient to admit a clip of the type shown in FIGURE 1 so that the clip can be positioned over the end of rib 43 of block 41 with its sides in straddling relationship thereto. A slot 57 extends from opening 56 to the end of intermediate body section 35 and past opening 44, see FIGURE 17A. As shown at 45, (FIGURE 17C) the roof of the channel 36 is somewhat lower in the vicinity of this slot than the portion of the channel which extends leftwardly from opening 56. This configuration in the channel has the effect of localizing the deformation in the web of the connector as is described more fully below.

A U-shaped clip pusher 62 is slidably mounted on ribs 34, 43 and in the channel 36 and has the end portion of its web cut away as shown at 64 to accommodate the projecting tab of the clip. This clip pusher extends rearwardly of the tool and into a central bore 69 in body sections 33 and 37 at which point it is connected at 66 to a piston rod 68 extending from a piston 70. This piston s reciprocable wihi a cylinder 76 having cylinder heads 67, 74 secured to the tool body by means of bolts 78. Piston 70 is normally biased leftwardly as viewed in FIGURE 17 by means of a spring 72 and is driven rightwardly by compressed air supplied through an air hose 80 from a suitable source. Advantageously, the valve (not shown) for actuating the tool is controlled by a pivoted trigger 82 in handle 32 which depresses the plunger 84 of the switch 86 mounted in the handle.

In use, a clip is inserted through the opening 56 as indicated in FIGURE 17 with the projecting tab extending toward the rear of the tool and the recess 64 of the plunger 62. The clip will then be in straddling relationship to the rib 43 of block 41 and will be in a position to be pushed rightwardly upon movement of clip pusher 62. Thereafter, the tool is aligned with the tab or post and moved relatively toward the post until its end is within the notch 54 on the underside of spring end 53. The end of the post will then be centrally located against mandrel head 48 and the upper surface of rib 46. The wire is then inserted as indicated in FIGURE 20 through the opening 44 until a sufficient length projects past the notch 50 in the mandrel. The trigger 82 is then depressed to drive the clip pusher rightwardly to strip the wire and form the electrical connection as illustrated in FIGURES 20–23.

The movement of the clip onto the post with concomitant stripping of the insulation from the wire takes place in essentially the same manner as was described above with reference to FIGURES 4–6 although there are certain minor differences noted below. Thus, the notch 7a in the end of the clip is first forced against the wire and pinches it and the insulation is pressed against the edges 52 of the anvil. The insulation is punctured and tears, and the conducting core of the wire is drawn from the severed insulation, through the notch 50, over the mandrel head, and downwardly against the terminal post. The wire adjacent to the connector passes through slot 57 during movement of the connector and the insulation adjacent to struck-up tabs 6 is compressed in the concavity formed by these tabs.

In the embodiment of FIGURE 17, the clip is confined, during its movement over the mandrel head 48 by the sides of channel 36 and by the top or roof 45 of the channel. The web of the clip is left unconfined only in the axial central zone of the slot 57 so that the deformation which takes place is localized in the central zone. In this manner, the wire strands are prevented from being widely spread during application. This feature is not present in the applicator tooling shown in FIGURES 4–6 although it can be incorporated in that tooling by providing a recess in the back wall of the lower end of the applicator 17 in FIGURE 7.

An alternative clip applying apparatus in accordance with the invention shown in FIGURES 27–41 operates on the same general principles as the tool of FIGURE 17. This embodiment is particularly adapted to apply a clip of the type shown in FIGURE 9 and includes clip feeding and wire feeding means and is particularly intended for wiring panels having a large number of terminal posts mounted thereon.

Referring to FIGURES 27, 28, 31 and 32, the various sub-assemblies of this embodiment including clip feeding and transferring means, wire feeding means, and clip applying means, are mounted on and around a main frame block 100 which is suspended in a frame housing by means of rods 102. These rods extend through openings 104 in the block (FIGURE 32) and have hemispherical nuts 106 on their ends which are received within counterbores in the openings 104 having hemispherical surfaces to permit limited swinging motion of the frame block. Advantageously, stop nuts 108 are also threaded on the lower ends of the rods 102 above the surface of the frame block. The upper ends of the rods 102 extend through openings in a top frame plate 112 and have hemispherical nuts 110 thereon which are received within complementary hemispherical recesses in the top plate. The frame housing comprises the top plate 112, T-shaped side plates 114, end plates 116, 118, 120, and a bottom plate 122 which has a central opening for the main frame block 100, this opening being sufficiently large to permit limited swinging motion of the frame block. The frame housing is supported by means of legs 124 secured to bottom plate 122. The purpose of suspending the main frame block within the frame housing by means of the rods 102 and the hemispherical nuts is to permit limited universal motion for alignment purposes as is described more fully below.

Terminal clips in strip form 130 are supplied to the apparatus from a reel 128 mounted on a bracket 126 which extends from top frame housing plate 112. Insulated wire 133 is supplied to the opposite side of the apparatus from the clips 130 from a reel 132 mounted on a similar bracket 126. In each cycle of operation, wire is fed towards the main frame block, a clip is also fed towards this block, and the clip is applied to the post with concomitant stripping of the wire as with the previous embodiments.

The main frame block has a relatively narrow slot 134 extending inwardly from the left-hand side thereof as viewed in FIGURE 35A in which there is mounted a plate 136 by means of fasteners 138 (FIGURES 35 and 35A). The corner of this plate which is disposed in the central section of the frame block is cut away as indicated at 140 and the adjacent vertical edge has a T-shaped mandrel substantially similar to the previously described mandrel of FIGURE 7. The mandrel head 145 thus has a centrally located groove 144 of a width slightly greater than the diameter of the conducting core of the wire and less than the diameter of the insulation of the wire. In this embodiment, the groove 144 extends to the lower end of the mandrel and its depth tapers slightly from top to bottom as is indicated in FIGURE 36. The edges of the mandrel on each side of the groove 144 are preferably left somewhat sharp to permit cutting of the insulation as the wire is drawn downwardly relative to the mandrel as with previous embodiments. It will be noted that plate 136 has a generally circular cavity 146 which is in alignment with a transverse bore 139 in frame block 100. This cavity and bore serve as a means for disposing of connecting slugs of the connector strip and insulation from the wire which are removed during operation, and to this end a compressed air stream is caused to flow through the bore during operation.

An elongated recess 150 is provided in the upper surface of the main frame block 100 and extends transversely of the slot 134. A block 151 which fits snugly into this recess comprises two substantially identical halves connected integrally by a neck portion 153 and has feet 152 on its lower side which support it above the bottom of the recess 150. Flat springs 154 (FIGURE 40) located in the bottom of recess 150 surround these leg or feet portions of the block 151 and have serrated ends 156 disposed on each side of the center line of slot 134.

A guide block 158 positioned within a channel in the face of block 151 is opposed to the plate 136 and has a central notch in alignment with the plate. A tongue extends towards the plate 136 from this notch and has an upper support surface 160 and an arcuate surface 161 on its underside. The blocks 151 and 158 are held in position in recess 150 by means of a clamping plate 162 which extends across their upper surfaces and is secured to the upper surface of the main frame block by means of fasteners 164.

The strip of terminal clips is fed through a strip feed block 166 composed of two identical halves and having a central arcuate passageway 168 which leads down toward the surface of the main frame block. This strip feed block is secured to the upper surface of the main frame block by means of flanges 167 (FIGURE 35) and has a recess or slot 170 on its left-hand side as viewed in FIGURE 31 communicating with passageway 168. The strip of clips is fed by means of a feed finger 174 disposed in slot 170 and pivoted to the end of one arm 176 of a bell crank lever which, in turn, is pivotally mounted at 177 between a pair of plates 178. The other arm 179 of bell crank lever has a pivotal connection with a block 180 threaded onto the end of a piston rod 181 of a pneumatic-piston cylinder 182 also mounted between the plates 178. It will be apparent that upon rightward movement of piston rod 181 as viewed in FIGURE 31, the feed finger 174 moves relatively downwardly towards the main frame block to advance the strip, this feed finger being maintained in resilient engagement with the strip by a spring 175. Advantageously, a slight frictional drag is applied to the strip of clips by means of a lever 183 pivotally mounted between the plates 178 and resiliently biased in a counterclockwise direction by a spring 185.

The leading clip of the strip is laterally transferred by a transfer mechanism mounted in a generally U-shaped bracket. This bracket has side members 186 and flanges 185 which are secured to the main frame block on the left-hand side thereof as viewed in FIGURE 27 and has a web 187 extending between these side members. A panel 188 is mounted on the underside of this bracket and supported by a shoulder on the side of the main frame block and functions as a support surface for an L-shaped slide member 194 which is driven rightwardly by a piston rod 192 of a pneumatic piston cylinder 190 mounted between the plates 178, these plates being secured to the bracket on each side thereof. Slide member 194 is normally biased leftwardly in FIGURE 31 by a spring 198 which bears against the upstanding arm of the slide member and surrounds a pin extending from this arm. This spring on its other end is received within a recess 200 in the strip feed block 166.

A clip feed slide 202 is adjustably clamped to slide member 194 by a fastener 204 which extends through an over-sized slot in the feed slide. Advantageously, a set screw 205 is threaded into the slide member and extends through an opening in the web 187 of the bracket to permit changing of the limit of the stroke of the feed slide.

Feed slide 202 extends towards the center of the main frame block and is supported for reciprocation on the upper surface 206 of plate 136. At its inner end, this feed slide has a T-shaped extension 208 of about the same dimensions or slightly smaller than the T-shaped mandrel 142, 145. A guide insert 210 is provided in the block 166 at the lower end of the passageway 168 accurately to guide the strip to the transfer zone and into engagement with the T-shaped extension 208 on the end of the feed slide. The leading clip of the strip is fed over this T-shaped extension so that upon rightward movement of the slide as viewed in FIGURE 31, this leading clip is sheared from the strip and transferred to the vertically reciprocable clip pusher which is described immediately below.

The clip pusher 216 which moves the clip downwardly over the mandrel and onto the terminal post 10 is secured by means of a clamping block 218 (FIGURE 29) and fasteners 219 to a shoe 220. Shoe 220 is secured to the end of a piston rod 226 of a piston cylinder 228 which is supported on a plate 223, this plate being, in turn, supported by rods 222 threaded into the main frame block in surrounding relationship to the clip pusher. The piston of the piston cylinder 228 is normally biased upwardly by a spring 224 contained within the cylinder and is driven downwardly upon admission of compressed air into the upper cylinder end through a flexible air line as shown.

Clip pusher 216 is channel-shaped in cross-section as shown at 232 and is guided during its vertical reciprocatory motion by means of a notch 230 in clamping plate 162 (FIGURE 36A) and by the opposed faces 155 of the two parts of the block 151 between which this clip pusher slides as indicated in FIGURE 35A. It will also be noted from this figure that a notch 236 is provided on the side of recess 150 to accommodate and assist in the guiding of the clip pusher during its downward movement.

The lower end of the clip pusher has an enlarged recess 233 and the web at the lower end is notched as shown at 234 to accommodate the insulation support portion 26 of the connector. The sides of the recess 233 are preferably spaced apart by a distance such that the sidewalls of the clip will be held against lateral movement when the clip is located in the end of the recess 233 thereby to localize the deformation of the clip in its web as described above.

The wire feeding mechanism is contained in a U-shaped bracket similar to the bracket 186, 187 and secured to the right-hand side of the main frame block as viewed in FIGURE 31. This bracket has sides 238 and a web 239, the sides having flanges 240 thereon through which fasteners pass to secure the bracket to the frame block. A panel 242 is mounted on the underside of the bracket and a reciprocable wire feed slide 244 rests upon this panel and between the sidewalls of the bracket. A wire carrier tube 246 is clamped to slide 244 by means of a set screw 245 and projects towards the main frame block and through a bore therein. Wire carrier 246 has a depending fin 248 which is received within a slot 250 in the frame block 100 and has a nose portion 252 of square cross-section which is adapted to be slidably received in a notch 157 of block 151 beneath the neck portion 153 thereof. The bore in the wire carrier tube is relatively large in the rearward portion of the tube and is of a smaller diameter as shown at 256 in the nose portion thereof to assist in guiding the wire during feeding. An aligned bore 258 is provided in block 244 and an additional bore 260 in the web 239 of the bracket, these bores being of stepped internal diameter to assist in maintaining the alignment of the wire during the feeding operation.

As is explained below, wire feeding is accomplished by pulling the wire from the coil and to this end a wire clamp piston 262 is provided in slide 244. This piston has a clamping finger 266 which projects into the bore 258 in the slide so that upon downward movement of this piston into the bore, the wire is held against relative movement with respect to the slide. Piston 262 is normally biased upwardly by means of the spring within the cylinder bore 264 in the slide and the piston is supplied with air to clamp the wire by means of a flexible air hose 268. A similar clamping arrangement (FIGURE 34) is provided in the web 239 of the bracket and comprises a clamping finger 272 movable through a passageway in the bracket web into the bore 260. This clamping finger extends from a clamping piston 270 in a cylindrical bore in the web. This piston is normally biased leftwardly by a spring 271 and is supplied with compressed air through a flexible air line 274 when the wire is clamped.

Slide member 244 is normally biased rightwardly as viewed in FIGURE 31 by means of a spring 276 which acts between the slide member and a bracket 278 secured to the upper surface of the main frame block, a pin 280 advantageously being provided in the bracket to retain the spring in its proper position. The slide member 244 is moved leftwardly in FIGURE 31 to feed the wire by means of a piston rod 282 of a pneumatic piston cylinder 284 secured to the web 239 of the bracket and supplied with compressed air through an air line 286.

In use, the embodiment of FIGURE 27 is positioned over the terminal post 10 and supported by means of its legs 124 during the applying operation. Since perfect alignment of the clip pusher with respect to the terminal post may sometimes be difficult to achieve, there is provided means for swinging the frame block 100 with respect to the frame housing until substantially perfect alignment is achieved. The means for aligning the frame block in this manner comprises a pair of holding fingers 290 (FIGURES 28 and 30) which are slidable against inclined surfaces 288 on the underside of the frame block and are guided in their movement by means of slots 291 and machine screws 293 in the frame block which are received in the slots. The outer ends of the fingers have flanges 292 thereon and are secured to the ends of piston rods 294 of pneumatic piston cylinders 296 which in turn are secured by means of obliquely extending brackets 298 to the sides of the frame block. The ends of the fingers 290 each have an inwardly directed straight surface 302 and an arcuate surface 300 so that upon movement of the fingers towards each other along oblique paths towards the terminal post, the post is clamped between the two fingers and against the corners formed by the surfaces 300, 302. During such movement of the fingers, the entire frame block will be swung a slight distance to bring about alignment between the clip pusher and the terminal post.

The operating cycle of this embodiment of the invention is as follows. At the beginning of the cycle, the parts will be in the position of FIGURE 27 with the clip transfer slide, the wire feed tube, and the plunger 216 in their retracted positions. It is understood that the various pneumatic pistons will be actuated in the sequence described below either manually or preferably automatically by, for example, solenoid valves controlled by cams or switches.

Compressed air is first supplied to the cylinders 296 to drive the holding fingers 290 relatively towards each other. As explained immediately above, in the case of misalignment, the main frame block will be swung by these fingers and by their engagement with the terminal post a distance sufficient to bring the clip pusher into substantial perfect alignment with the terminal post. Thereafter, air is supplied to wire clamp 262 in wire feed slide 244 to clamp the wire in the feed slide and the slide is thereafter driven leftwardly in FIGURE 31 to pull the wire relatively over the mandrel, see FIGURE 36. The wire is then unclamped in slide 244 by exhausting the compressed air from the wire clamp 262 and the wire is clamped within the web 239 by admitting compressed air to the wire clamp 270, (see FIGURE 34). Air is then exhausted from piston cylinder 284 and the slide 244 is allowed to return to its normal position under the influence of spring 276. At this stage in the cycle, the wire will extend from the nose of the wire feed tube past the path of reciprocation of the clip pusher and over the mandrel as is shown in FIGURE 37.

The clip transfer slide 202 is then moved rightwardly in FIGURE 31 by admitting compressed air to piston cylinder 190 so that the leading clip of the strip, which is located on the extension 208 of slide 202 is sheared from the strip by the edge 212 in the feed block 166. The remaining slug or tab on the lower end of the clip is simultaneously removed by the edge 214 on the tongue 160 and this slug drops downwardly into bore 139 from which it is removed by a blast of compressed air. Upon further rightward movement of the transfer slide 202, the severed clip is pushed into the recess 232 in the lower end of the clip pusher until it is lodged therein with its sidewalls held between the opposed sidewalls of the clip pusher as is shown in FIGURE 37.

The transfer slide remains in its extended position of FIGURE 37 until the clip pushed 216 begins its downward movement and carries the clip off of and past the transfer slide after which the slide may be returned to its starting position. The clip pusher moves downwardly past the wire and pulls the wire down against the mandrel so that the edges on each side of the groove 144 cut into the wire insulation as was previously described. At this time, the clip is slid downwardly over the T-shaped mandrel 142, 145 and its sidewalls are retained between the sidewalls of the clip pusher so that the web of the clip yields under the jamming influence of the wire rather than the clip sidewalls which are supported. The wire end, during this interval, is drawn out of its insulation and into the tapering groove 144 and the insulation remains on the top of the mandrel and drops into the cavity 146 from whence it is removed by compressed air. The aligning fingers 290 are retracted during the downward travel of the clip pusher to permit the clip to move downwardly onto the terminal post as is indicated in FIGURE 38. The clip pusher then retracts and the clip feeding mechanism is actuated to feed the next clip of the strip downwardly over the T-shaped extension 208 of the feed slide.

Where two different terminal posts are being electrically connected, the apparatus is then repositioned over the second post and a substantially similar operating cycle is followed. The cycle for the second post, however, differs from the foregoing in that during wire feeding, the wire is dragged forwardly towards the central portion of the main frame block by the feed slide until it is gripped between the serrated ends 156 of the springs 154 as is shown in FIGURES 39 and 40. Upon further forward movement of the wire feed slide, the wire is sheared by the lower edge 304 of the nose portion of the feed slide and the edge 306 of the block 158. The section of insulation which remains between the ends 156 of the springs is removed in the subsequent operating cycle of the same type. That is, as the wire is pulled past the fingers, it dislodges the remaining insulation and moves it into recess 146. In other respects, this operating cycle is substantially the same as the operating cycle for the first clip as is described above.

Where a relatively large panel is being wired, the apparatus of FIGURE 27 can be mounted on a coordinately movable frame and positioned over the various posts which are to be wired in the order in which they are to be connected to each other and among each other. Multiple connections can be made with a single post by merely stacking the connectors on top of each other on the posts.

FIGURES 41–44 show a further embodiment of a tool in accordance with the invention having means for intermittently feeding terminal clips in strip form and delivering the leading clip of the strip to a position in front of the clip pusher. The tool 310 has a pistol grip type handle 312 and a trigger 311 which controls a suitable air valve (not specifically shown) to admit air through a compressed air line to a pneumatic piston-cylinder 314 on the upper end of the tool. The tool mechanism, including the clip pusher, the anvil, and the strip feed mechanism is contained between a pair of side plates 316, 318. The piston rod 320 of the piston-cylinder 314 is secured at its forward end to a camming block 322 which moves leftwardly in FIGURE 42 upon actuation of the piston-cylinder. An upwardly extending arm 324 of the block 322 is coupled to a pair of coupling blocks 326, 328 which are normally held in engagement with each other by means of an overload release coupling of the type disclosed in my copending application, Serial No. 302,896, filed August 19, 1963, for Apparatus for Making Electrical Connections. The clip pusher 330 is coupled to the block 328 and extends towards the frontal end of the tool. As explained in my copending application, Serial No. 302,896, the object of this overload release coupling between the piston rod and the clip pusher 330 is to prevent the imposition of unduly high stresses on the clip being applied to the terminal post. Since this particular form of coupling between the piston rod and the clip pusher forms no part of the present invention, it need not be further described here.

The clip pusher 330 has an enlarged frontal end 332 which is recessed on its underside to conform to the external shape of the terminal clip. This clip pusher is movable leftwardly from the position shown in FIGURE 42 over a transfer slide 326, described below, over the mandrel on the mandrel block 334, and beyond the lefthand end of the tool. A spacer block 325 contained between the plates 316, 318 has a suitable guide channel on its underside for guiding the clip pusher during its travel over the mandrel.

The transfer slide 336 is vertically reciprocable, as viewed in FIGURE 42, from the position shown in the drawing in which it is in alignment with the mandrel to a clip loading station indicated at 337. The upper end of this transfer slide is provided with a projection having a T-shaped cross-section for supporting and holding the leading clip of the strip while it is being transferred from the clip loading station to a position in alignment with the mandrel. Transfer slide 336 has a pin-slot connection 340 with the left-hand end of a lever 342 which is pivoted intermediate its ends as shown at 344 to the housing plate 318. The lever 342 is oscillated about its pivotal axis 344 during each operating cycle of the tool by means of a stiff wire spring 346 secured to and extending downwardly from the block 322. The lower end of this spring is received within a groove or channel 348 on the upper side of the lever 342. It will be apparent from an inspection of FIGURE 42 that upon leftward movement of the block 342, the lever will be swung to a slight arc in a counterclockwise direction by the spring 346 after this spring has passed the pivotal axis 344. During the return movement of the block 342, the lever will be swung through a corresponding clockwise arc after the spring passes the pivotal axis 344 on its return trip.

The strip of clips 350 is contained on a suitable reel 352 mounted on a bracket extending from the frame plate 316 and is led from a reel along a strip feed path extending between the frame plates and over a feed surface 354 on a block 356 which is secured to the plate 318. The strip is advanced a distance equal to the plate 318. The strip is advanced a distance equal to the length of an individual clip during each operating cycle by means of a feed pawl 358 pivotally mounted on a pin 359 in a block 360. A torsion spring 362 normally biases the feed pawl 358 in a clockwise direction about its pivotal axis so it is urged upwardly as viewed in FIGURE 42 and lodges between two adjacent clips of a strip on the underside of the strip.

An arm 355 integral with the block 36 extends rearwardly through a slot in the block 356 and has pin-slot connections with the block 356 as shown at 353. The rearward end of the arm 355 has a laterally extending ear 357 which is disposed adjacent to the righthand side of the block 322. This arrangement is provided for the purpose of retracting the feed pawl 358 at the end of each operating cycle as described below.

Upon leftward movement of the piston rod 320 and the block 322 from the position shown, the leading face 363 of block 322 moves against the depending portion of the feed block 360 to move block 360 leftwardly and advance strip of clips a distance equal to an individual clip. The leading clip of the strip will then be moved onto the T-shaped projection on the upper end of the transfer slide 336.

The alternative form of mandrel of the embodiment of FIGURES 41–44 is, like the previously described mandrels, of generally T-shaped cross-section having a rib portion 364 and a head portion 366. An opening 368 extends into the mandrel intermediate the ends thereof but in this instance slopes diagonally leftwardly as viewed in FIGURE 42; that is to say, the wire receiving opening slopes inwardly of the mandrel head and towards the frontal portion of the tool. A groove or channel 372 is provided on the upper surface of the mandrel head and slopes rearwardly towards the wire receiving opening 368. Immediately adjacent to this opening, the slope of this groove increases abruptly as shown at 374 to define a relatively narrow guide passage for withdrawal of the conducting core of the wire.

The slope of the wire receiving opening 368 defines a pair of relatively sharp cutting edges 370 on each side of the portion 374 of the groove in the mandrel head. An advantage then of providing the wire receiving opening as shown in FIGURE 43 is that a smaller angle is achieved in the cutting edges 370 on each side of the groove portion 374. In effect then, a sharper cutting edge is achieved which facilitates the severing of the insulation on the wire when the insulation is relatively tough and difficult to cut.

During operation of a tool in accordance with the embodiment of FIGURE 41, the parts will normally be in the positions shown in FIGURE 42 with the transfer slide in its raised position and with a single terminal clip disposed on the T-shaped projection on the upper end of the transfer slide. Upon pressing the trigger 311, compressed air is admitted to the rearward end of the piston cylinder to drive the piston rod 320 and the clip pusher 330 leftwardly. When the enlarged frontal end 332 of the clip pusher moves over the upper end of the transfer slide 336, it picks up the individual terminal clip on the upper end of this slide and pushes it over the T-shaped projection on the mandrel, past the wire receiving opening 368, and onto the terminal post with which the tool is being held in alignment. During movement of the clip past the wire receiving opening, the insulation of the wire is pushed against the cutting edges 370, the insulation is severed, and the conducting core of the end portion of the wire withdrawn from the severed section of insulation as previously described. Also, during this forward stroke of the clip pusher, the transfer slide 336 is lowered by the spring 346 on the underside of the camming block 322 until the T-shaped projection on the transfer slide is in alignment with the surface 354 over which the strip of clips is fed. During the final portion of the forward stroke, the surface 363 moves against the rearwardly facing surface of the feed block 360 and advances the feed pawl to move the leading clip of the strip onto the T-shaped projection of the transfer slide. During the return stroke of the piston rod and after the enlarged end 332 of the clip pusher is moved rightwardly beyond the vertical path of reciprocation of the transfer slide, the spring 346 causes the lever 342 to rock in a clockwise direction and raise the transfer slide. During upward movement of the transfer slide, the leading clip is sheared from the strip of clips by the edge 371 of a block which cooperates with the edge of the transfer slide. The feed pawl is retracted when the block 322 moves against the ear 357 of arm 355 and pushes this arm rightwardly in FIGURE 42 at the end of the return stroke.

FIGURES 45–57 show a type of mandrel and terminal clip which is used where a connection is to be made to the side 378 of an extremely thin post 376. Terminal posts of this type are ordinarily spaced together very closely and are widely used on relay blocks and the like. Ordinarily, the conductors are connected to posts of this type by inserting the end portion of the conductor through an opening in the post and soldering the connection. Because of the extremely close spacing of these posts, it is impractical to make a clip type connection with one of the faces of the post and it is necessary to connect the wire to the edge 378.

A clip for forming connections of this type has sidewalls 380, 382 which extend from a generally cylindrical web 384. An insulation support 386 is struck out from the lower end of the web to function, as previously described, as a strain relief and supporting means. The insulation support in this instance comprises an ear which is cut from the web and formed as a cylindrical pocket at the lower end of the terminal clip. The sidewall 382 is relatively short and extends partially along one side of the terminal post while the sidewall 380 extends entirely across the opposite side and has a flange 388 on its ends which is adapted to extend around the edge of the post which is opposite to the edge against which the wire is being held. The end portion of the flange 388 is curled as shown at 390 and adapted to bear against the wide side of the post against which the sidewall 382 bears. Advantageously, the sidewall 380 is provided with an outwardly concave rib extending axially therealong which functions as a spring means to permit the terminal clip to adapt itself to variations in the post width of the wire diameter.

A tool for making electrical connections of the type shown in FIGURES 46 and 47 will in general be similar to the previously described tools excepting that a mandrel of the type shown at 394, 396 is required. The head portion 396 of this mandrel conforms in cross-section to the internal cross-section of the terminal clip and a suitable clip pusher (not specifically shown) is provided to push the clip over the mandrel and onto the post 376. The wire receiving opening 398 in this instance comprises a slot extending transversely and preferably diagonally across the mandrel head and the wire 400 is inserted from the side of the mandrel head into this opening as is indicated in FIGURE 46. Upon relative downward movement of terminal clip from the position of FIGURE 46 to the position of FIGURE 47, the insulation support of the clip moves against the wire, pushes the wire against the edge of the opening 398 causing severing of the insulation and subsequent withdrawal of the end portion of the conducting core from the severed section of insulation. The finished electrical connection will then appear as in FIGURE 47 and the severed section of the insulating tubing will remain in the groove or channel until removed.

From the foregoing description of three specific embodiments of the invention, it will be apparent that the principal structural parts of an apparatus in accordance with the invention are the mandrel and a suitable clip pushing means. The mandrel need not necessarily have a T-shaped cross-section but could have an L-shaped or other cross-section for some forms of terminal clips. While the mandrels disclosed herein all comprise a head and a rib which is coextensive with the head, it is contemplated that the rib can be eliminated in part and a cantilever type mandrel head provided. The essential functions of the mandrel are to act as a guide for the terminal clip during its movement onto the terminal post and to provide a working surface over which the wire is dragged and against which the wire may be flattened. The mandrel may have an opening, such as the opening 368 in FIGURE 43, for the wire and the provision of such an opening is advantageous in hand tools; but, the opening is not essential as evidenced by the wiring machine in accordance with the embodiment of the invention shown in FIGURES 27–41. When the wire being used is insulated with a relatively thick plastic covering, it is advantageous to provide cutting edges on the mandrel, as shown at 370 in FIGURE 43, to effect stripping of the insulation from the end portion of the wire. However, such cutting edges would not be required when the invention is used with uninsulated wire. The mandrel can be provided with a means for slitting an insulating sheath on a wire during movement of the wire over the mandrel (application Serial No. 282,092, filed May 21, 1963) or with a suitable scrapping means for scraping an insulating film such as "Formvar" (polyvinyl formal resin) from the wire as described in application Serial No. 367,479, filed May 14, 1964.

In addition to the guiding function of the mandrel, this member can also be utilized to size and reform the clip during application for optimum electrical connections. In accordance with the invention, the wire should be compressed against the surface of the mandrel and plastically deformed to expose fresh metal for the post-wire interface which functions as the electrical contact. Additionally, the clip should hold the wire against the surface of the post with a force which is sufficient to maintain a good electrical connection. In order to achieve these desiderata, the mandrel head advantageously should have a thickness which is substantially equal to, or slightly less than, the thickness of the post so that while the wire is being dragged over the mandrel by the clip, the clip will adapt itself to the diameter of the wire. The deformation of the clip is controlled in that it is confined within the leading end of the clip pusher while such deformation is carried out. This clip sizing function of the mandrel and clip pusher permits the use of different wire sizes with a single clip and post size.

It should be noted that when clip type connections are made with a mandrel and clip pusher as herein disclosed, the post itself is not highly stressed since the highest stresses are reached while the clip is dragged the wire over the mandrel. These relatively high stresses are caused by the tearing of the insulation and by the flattening of the wire and are borne by the clip, the mandrel, and the clip pusher. By the time the clip has moved to the end of the mandrel, the wire will have been flattened and the stress on the mandrel will have fallen to a comparatively low level. The importance of this facet of the invention is that the post need not be extremely sturdy and it can be mounted in a relatively insecure or weak base such as a printed circuit board.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. Apparatus for making an electrical connection between a conductor and a terminal post by means of a clip, said clip being telescopically movable into said post, said apparatus comprising, a generally T-shaped mandrel having a head portion and a rib portion, said head portion having a conductor receiving opening extending inwardly from one side thereof, and transversely thereacross, and means for moving said clip over, and beyond one end of, said mandrel whereby, upon locating said conductor in said opening and moving said clip over said mandrel, beyond said one end of said mandrel, and onto a terminal post, said clip moves against said conductor and drags said conductor from said opening and onto said terminal post, said clip functioning to hold said conductor against, and in electrical contact with, said opening after coming to rest thereon.

2. Apparatus for making an electrical connection between a conductor and a terminal post by means of a clip which is axially movable onto said post, said apparatus comprising, a generally T-shaped mandrel having a head portion and a rib portion clip moving means for moving said clip along a predetermined path extending over, and beyond one end of, said mandrel, a conductor receiving opening extending across said head portion and transversely of said predetermined path whereby, upon locating said conductor in said opening and moving said clip over said mandrel and onto a terminal post in alignment with said mandrel, said clip moves against said conductor and drags said conductor onto said terminal post, said clip remaining on said post and holding said conductor against and in electrical contact with, said post.

3. Apparatus for electrically connecting a conductor to a narrow side of a terminal post of rectangular cross-section by means of a clip, said clip being axially movable onto said post, said apparatus comprising a generally T-shaped mandrel having a head portion and a rib portion, said head portion having a generally rectangular cross-section which substantially conforms to the cross-section of said post, clip moving means for moving said clip over, and beyond one end of, said mandrel, said head portion having a conductor receiving opening extending thereacross and inwardly from one side thereof whereby, upon positioning said conductor in said opening and positioning said mandrel against said post, and upon moving said clip over said mandrel and onto said post, said clip drags said conductor from said opening and onto said post, and said clip remains on said post and holds said conductor against said narrow side after coming to rest thereon.

4. Apparatus for electrically connecting a conductor to a narrow side of a terminal post by means of a terminal clip having an open seam extending axially along one side thereof, said clip being telescopically movable onto said post, said apparatus comprising, a generally T-shaped mandrel having a head portion and a rib portion, said head portion having a generally rectangular cross-section which conforms to the cross-section of said post, clip moving means for moving said clip along a predetermined path extending over, and beyond one end of, said mandrel, a conductor receiving opening extending into said head portion from one side thereof and transversely thereacross whereby, upon positioning said conductor in said opening and upon moving said clip over said mandrel and onto a terminal post in alignment with said head portion of said mandrel, said clip drags said conductor from said opening, along said one side of said mandrel, and onto said narrow side of said post, and said clip remains on said post and holds said conductor against said narrow side after coming to rest thereon.

References Cited by the Examiner
UNITED STATES PATENTS

| | | | |
|---|---|---|---|
| 2,591,649 | 4/52 | Whiting | 7—5.4 |
| 3,019,517 | 2/62 | Lovecky | 29—203 |
| 3,095,640 | 7/63 | Butterworth et al. | 29—203 |

WHITMORE A. WILTZ, *Primary Examiner.*